United States Patent [19]

Amsel

[11] 4,380,442

[45] Apr. 19, 1983

[54] FLEXIBLE COUPLING

[75] Inventor: Friedrich-Wilhelm Amsel, Gorxheimertal, Fed. Rep. of Germany

[73] Assignee: Firma Carl Freudenberg, Weinheim, Fed. Rep. of Germany

[21] Appl. No.: 236,183

[22] Filed: Feb. 20, 1981

[30] Foreign Application Priority Data

Mar. 15, 1980 [DE] Fed. Rep. of Germany ....... 3010127

[51] Int. Cl.³ ........................... F16D 3/00; F16D 3/58
[52] U.S. Cl. ........................................ 464/93; 464/76; 464/87; 464/96
[58] Field of Search .................. 464/73–76, 464/80, 83, 87, 92–96, 98

[56] References Cited

U.S. PATENT DOCUMENTS

| | | | |
|---|---|---|---|
| 2,449,654 | 9/1948 | Jessop | 464/93 |
| 2,924,082 | 2/1960 | Reich | 464/94 X |
| 2,998,717 | 9/1961 | Schwenk | 464/93 |
| 3,308,637 | 3/1967 | Deuring | 464/93 |
| 3,316,737 | 5/1967 | Hulley | 464/94 |
| 3,662,568 | 5/1972 | Kashima et al. | 464/93 |
| 3,731,499 | 5/1973 | Morlon | 464/93 |

*Primary Examiner*—John Petrakes
*Attorney, Agent, or Firm*—Kenyon & Kenyon

[57] ABSTRACT

A rotary flexible coupling has two interleaved sets of input and output driver blocks connected to input and output flanges, respectively. First and second tires of inelastic material are spaced radially inwardly and radially outwardly from the blocks. Each block is connected to each tire by a cylindrical segment of a cylindrical layer of elastomeric material and torque is transmitted from the input blocks to the output blocks via the elastomeric layers and the tires.

8 Claims, 4 Drawing Figures

FLEXIBLE COUPLING

BACKGROUND OF THE INVENTION

1. Field of the Invention

The invention relates to a rotary flexible coupling consisting of an even number of driver blocks which have end faces extending in the radial direction as well as fastening elements for alternatingly connecting suitably designed connecting elements of input and output flanges.

2. Prior Art

A flexible coupling of the above-mentioned type is described in German patent publication No. 22 34 437, which shows driver blocks with rubber columns between them. The columns, which extend in the circumferential direction and connect end faces of the blocks located opposite each other, extend essentially parallel to the axis of rotation of the driver blocks. As a result, the transmission of the torque introduced is limited substantially to that portion of the rubber columns which is stressed in compression and, therefore, to about 50% of all the rubber columns provided. The resulting weight and dimensions with respect to transmitting a given torque are therefore extremely unsatisfactory.

In addition, the rubber columns must be designed so that the nominal torque can be transmitted nondestructively. Such a design, however, requires that the rubber columns have a very stiff and inelastic characteristic when transmitting very low torques, which is extremely undesirable for use in the power train of a motor vehicle. It is also a drawback that overloads, which can never be precluded in such applications, can lead directly to the destruction of, or at least to damage to, the rubber columns.

OBJECTS AND SUMMARY OF THE INVENTION

It is an object of the invention to develop a rotary flexible coupling, which is especially for use in the power train of a motor vehicle and which has a particularly soft and resilient spring characteristic when transmitting low torques.

Another object is to provide a rotary flexible coupling that ensures good attenuation of vibrations.

A further object is to provide a rotary flexible coupling which can be highly overloaded without the danger of damage.

In accordance with the invention, a rotary elastic coupling of the type mentioned at the outset is provided with fastening elements and connecting elements that have mutually engaging projections which extend in the axial or radial direction or both. Two tires of inelastic material are located radially inside and outside the driver blocks, and the driver blocks, which have a circular-ring sector-like profile, are each connected to the tire by a layer of elastomeric material.

The driver blocks are not connected to each other by rubber columns but are each connected in the radial direction both inwardly and outwardly, to the inelastic tires, and thereby to each other, by a layer of elastomeric material. The tires are designed to be stiff in themselves; they consist preferably of metal. The torque applied to the coupling is transmitted by generating a shear stress in the rubber layers, so that the structural dimensions can be kept small due to the uniform stress of all layers.

In the no-load condition or when small torques are being transmitted, the layers have a particularly soft elastic behavior and, as a result, the clutch has a soft spring characteristic. If greater torques or very heavy overhoads occur, then the opposing end faces of the driver blocks move so that they lie directly on each other, and a form-locking connection between the input and output shaft is obtained without danger of damaging the layers. Adequate safety with respect to the use of rubber mixtures is obtained if the thickness of each layer is about 0.7 to 2.5 times the mutual distance of the end faces of the driver blocks at the outside or inside circumference, respectively. The end faces of the driver blocks are planar and are in a plane coinciding with the axis of rotation. The absolute value of the thickness of the layer of the rubber-elastic material between the driver blocks and the inner tire is smaller, corresponding to the smaller distance from the axis of rotation, than the absolute value of the thickness of the layer between the driver blocks and the outer tire.

The radial elastomeric intermediate layers are preferably designed so that equal stresses of these layers are obtained.

The succeeding driver blocks are alternatingly connected in rigid form to the input and output flanges in order to prevent the blocks from being twisted or canted when torque is being applied. The fastening and connecting elements which can be considered must be designed accordingly, and they preferably have mutually engaging projections that extend axially or radially. The input and output flanges can be bolted, for instance, to the driver blocks, and a single screw per driver block may be sufficient for that purpose if it is properly arranged. With respect to the transmission of greater torque or heavier vibrations, on the other hand, it is better to use either two screws parallel to each other in each driver block or to arrange at the driver block an additional projection that extends in the axial direction and engages in a corresponding recess of the input or the output flange.

The layers of the elastomeric material must be connected firmly to the tires inside and outside of the driver blocks. A very strong bond of this kind can be produced by direct vulcanization. However, this should not preclude the possibility of fabricating the layers independently of the tires and the driver blocks and joining all parts together in the manner proposed by a final assembly operation. In particular, that makes the generation of an elastic pre-tension within the layers in the radial direction possible in a particularly advantageous manner. The mutual spacings of the individual driver blocks can be determined with a corresponding design by using additional adhesives in the region of the contact surfaces or by arranging radial projections at the tires and the layers so that the layers and the driver blocks are fixed in a given geometric position.

The surfaces that define the driver blocks and the tires in the radial direction and face the layers can be made spherical in the same sense. As a result, the buckling elasticity can be substantially improved, which makes it possible to use the proposed structure also for shafts that are not aligned.

The angle which is enclosed by respective opposite end faces of the driver blocks can be alternately small and large in regularly recurring form. This gives the proposed coupling different elasticity depending on the direction of rotation, which has a positive effect, particularly with respect to its use in the power train of a motor vehicle. For forward operation, this train should have particularly large elasticity, which is not always necessary to the same extent for reverse travel. The proposed coupling connects the one feature with the other, since it has been found to be particularly advantageous if the ratio of the large angle to the small angle is between 1.5 to 4. Within this ratio range, satisfactory travel comfort is achieved in forward travel as well as in reverse travel.

In order to prevent noise from developing when the end faces of the driver blocks hit on each other, it is proposed to provide at least one each of these opposing surfaces with a buffer layer of an elastically resilient material. The buffer layer may consist of an elastomeric material and may be cemented to the respective end face. However, it has been found to be preferable for mass production to produce the buffer layer by forming-on and vulcanizing in the same operation and in the same tool as the layers of the rubber-elastic material between the driver blocks and the outer and inner tires. In general, it does not increase the cost, and it offers considerable advantages, if the buffer layer is incorporated on both end faces of the driver blocks so that a continuous coating of the elastomeric material is obtained on all surfaces extending parallel to the axis of rotation of the coupling.

The thickness of the buffer layers can be small and, in general, it is sufficient if the surface is a plane surface aligned in all regions toward the axis of rotation of the coupling. By such a design alone, noise development that would otherwise result when the metal driver blocks struck each other is prevented. Because of the form-locking clamping of the plane buffer layers, which applies in this load situation, and is in the radial direction between the tires and in the circumferential direction between the end faces of the driver blocks, the latter exhibits little elastic resiliency, which causes a spontaneous increase of the spring stiffness. Such a spontaneous increase which could lead under certain conditions to damage of connected machine parts, can be prevented if the surface of the buffer layers has one or more bulges that extend in the circumferential direction and may be, for instance, of spherical shape. The height of the bulges is preferably chosen so that the steep spring characteristic, which prevails under the load conditions mentioned and results from the high degree of deformation of the rubber layers, is changed uniformly, avoiding a sharp break point, into an again substantially steeper curve. Even forces resulting from shock loads are thereby intercepted uniformly.

The design of the proposed coupling, in which the driver blocks have spacings of different size in the circumferential direction by pairs, can be used in pairs to particular advantage in the power train of a motor vehicle, in which the driver blocks of a first coupling are connected on the output side to the driver blocks of a second coupling so that the large spacings of the second coupling are opposite the small spacings of the first coupling. In such an arrangement, the properties of both couplings add in a particularly advantageous manner, and in addition to good insulation of vibrations that are introduced with small torques, good damping of vibrations that occur in the transmission of greater torques is achieved.

In addition to the advantageous dynamic properties mentioned, the proposed coupling has the advantages of having small dimensions and low weight. The latter can be reduced to a minimum if aluminum is used for the driver blocks and the tires.

The proposed coupling has an excellent centering effect with respect to the shaft ends connected to it. This facilitates installation of the coupling and it is an advantage worth emphasizing that the occurrence of centrifugal forces influences neither the effectiveness nor the operation.

DETAILED DESCRIPTION OF THE INVENTION

Figure 1:
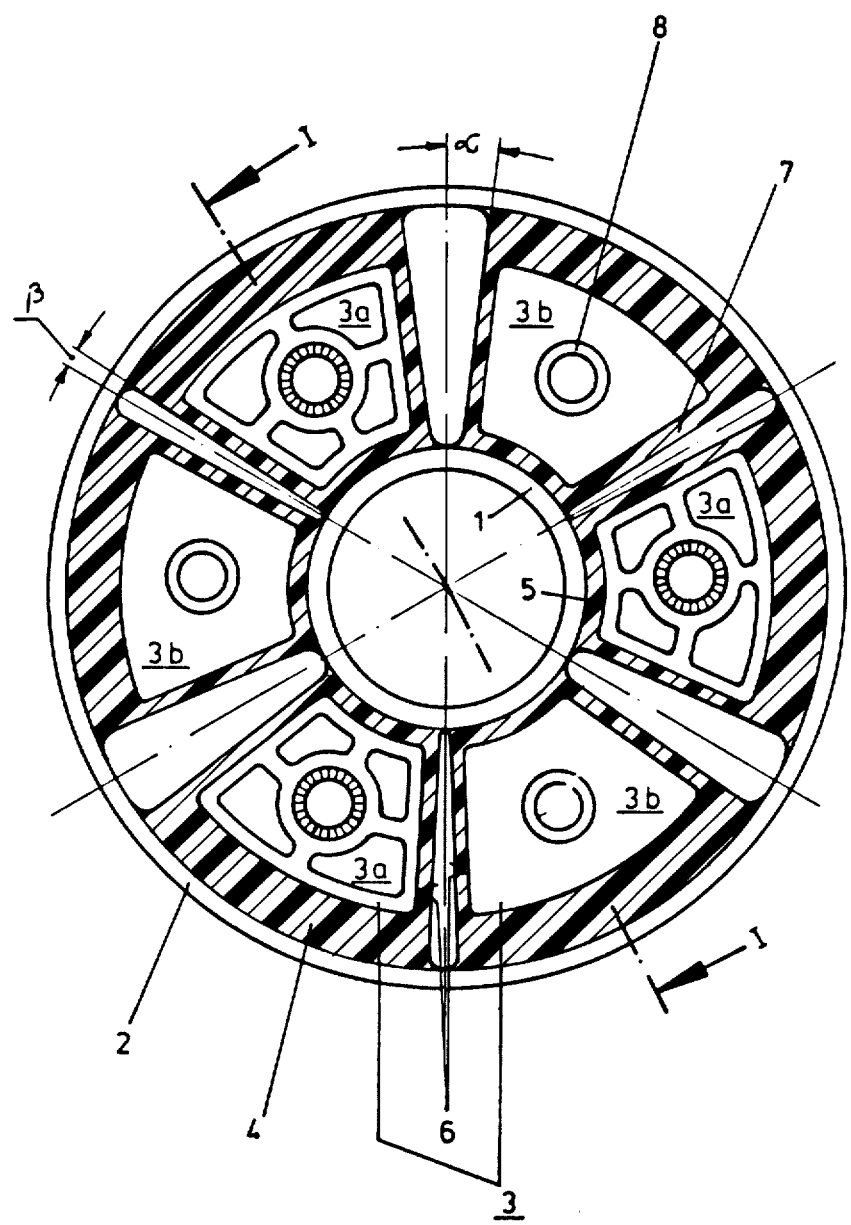
FIG. 1 shows a front view of a coupling in which the driver blocks have spacings of different size by pairs.

The coupling shown in FIG. 1 consists of an inner tire 1, an outer tire 2, and driver blocks 3 arranged in the space between them. These parts consists of metallic material, such as aluminum, for example, and are connected to each other by vulcanizing an elastomeric material arranged in layers in the spaces in between them to form an outer layer 4 and an inner layer 5. A layer of the cross-linked elastomeric material is vulcanized onto the end faces 6 of the driver blocks 3, and the front side of this layer is in a plane directed toward the axis of rotation of the coupling.

The driver blocks 3a are rigidly connected to an input flange which is not shown, while the driver blocks 3b are connected to an output flange, which is also not shown. The coupling is arranged generally in the axial direction between the input and output flanges, and these flanges are preferably also rotationally symmetrical, which, of course, has no influence by itself on the operation of the proposed coupling.

The operation of the coupling will now be described.

If a clockwise torque is introduced via the input flange into the driver blocks 3a, a clockwise shear stress results in the layers between the driver blocks and the inner and outer tires. The force introduced is transmitted by the latter to the layers between the tires and the driver blocks 3b and from these to the output flange connected thereto. The shear stress in the layers between the driver blocks 3a and the tires is therefore identifical with that between the driver blocks 3b and the tires, and the respective deformations are accordingly the same. The excursion of each individual block from its neutral position is accordingly identical.

If a still greater torque is introduced, increasing deformation of the layers 4 and 5 results.

With greater torques or with overload that occurs suddenly, the surfaces of the buffer layers facing each other make contact at the end faces. Since these are prevented from expanding in the radial direction inward and outward by the tires and in the circumferential direction by the end faces of the driver blocks, they are not able to deform very much, and the applied torque is transmitted directly by the driver blocks.

The driver blocks have spacings of different size by pairs. As a result, if force is introduced opposite the direction of applied torque, only relatively less elastic deformation of the layers is possible. Such a reduction, however, is generally not in the way of using the coupling in the power train of a motor vehicle because the range of loads occurring in reverse travel is substantially less than for forward travel.

The driver blocks have a cylindrical recess which is parallel to the axis of rotation and which has a bushing 8 therein for antirotationally anchoring the input and output flanges, respectively. The bushing has a serration at its end face to engage a corresponding serration of the input or output flange.

The elastomeric layers 4 and 5 are each almost separated into circular segments between the tire 1 and each of the blocks 3 and between each of the blocks 3 and the tire 2, respectively. However, the layers 4 and 5 can be continuous.

There is a radial buffer element of elastomeric material extending along each radial end surface of each of the blocks 3. It will be noted that the angular distance $\alpha$ between the buffer element on the clockwise facing radial surface of each of the blocks 3a is spaced from the buffer element on the counterclockwise facing radial surface of each of the blocks 3b is greater than the angular distance $\beta$ between the buffer element on the clockwise facing radial surface of each block 3b and the buffer element on the counterclockwise facing surface of each block 3a. The ratio of the magnitude of $\alpha$ to $\beta$ is with the range of approximately 1.5:1 to approximately 4:1, with the larger angle $\alpha$ being between those surfaces of the buffer elements that would be pushed relatively toward each other in driving the vehicle forward and the angle $\beta$ being between those buffer elements that would be pushed relatively toward each other in driving the vehicle in reverse.

Further, it has been found to be preferable to have the radial thickness of the layers 4 and 5 to be approximately 0.7 to 2.5 times the mutual distance of the radial end surfaces of the blocks 3 at the outside and inside circumference, respectively.

Figure 2:
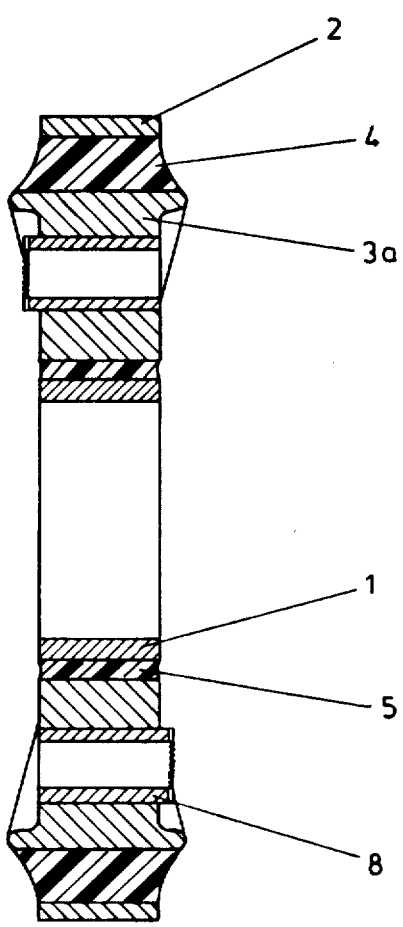
FIG. 2 is a longitudinal cross-sectional view of the coupling according to FIG. 1.

FIG. 2 shows the coupling in FIG. 1 in a longitudinal section to illustrate that the layer 4 arranged on the outside in the radial direction can have a greater axial length than the layer 5 that is located radially within the driver blocks 3. As a result of these relationships, the outside dimensions can be reduced or, with the same outside diameter, the elastically transmittable torques can be increased. It should be attempted, however, to keep the specific stresses in the cross-section of the outer layers 4 and the inner layers 5 so that they are of a comparable order of magnitude.

Figure 3:
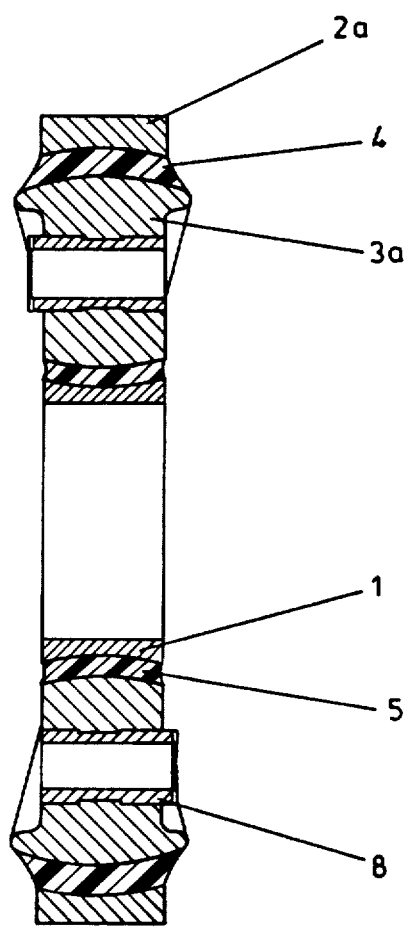
FIG. 3 shows another embodiment, in which the surfaces of the driver blocks and the tires facing the rubber layers are rounded convexly in the same sense.

FIG. 3 shows another embodiment of the coupling in which the surfaces defining the driver blocks and the tires in the radial direction facing the layers are made spherical in the same sense. As a result the elasticity is much improved if the connected shafts connected to the coupling, but not shown, are arranged at an angle. To a limited degree, gimbal properties are also obtainable.

Figure 4:
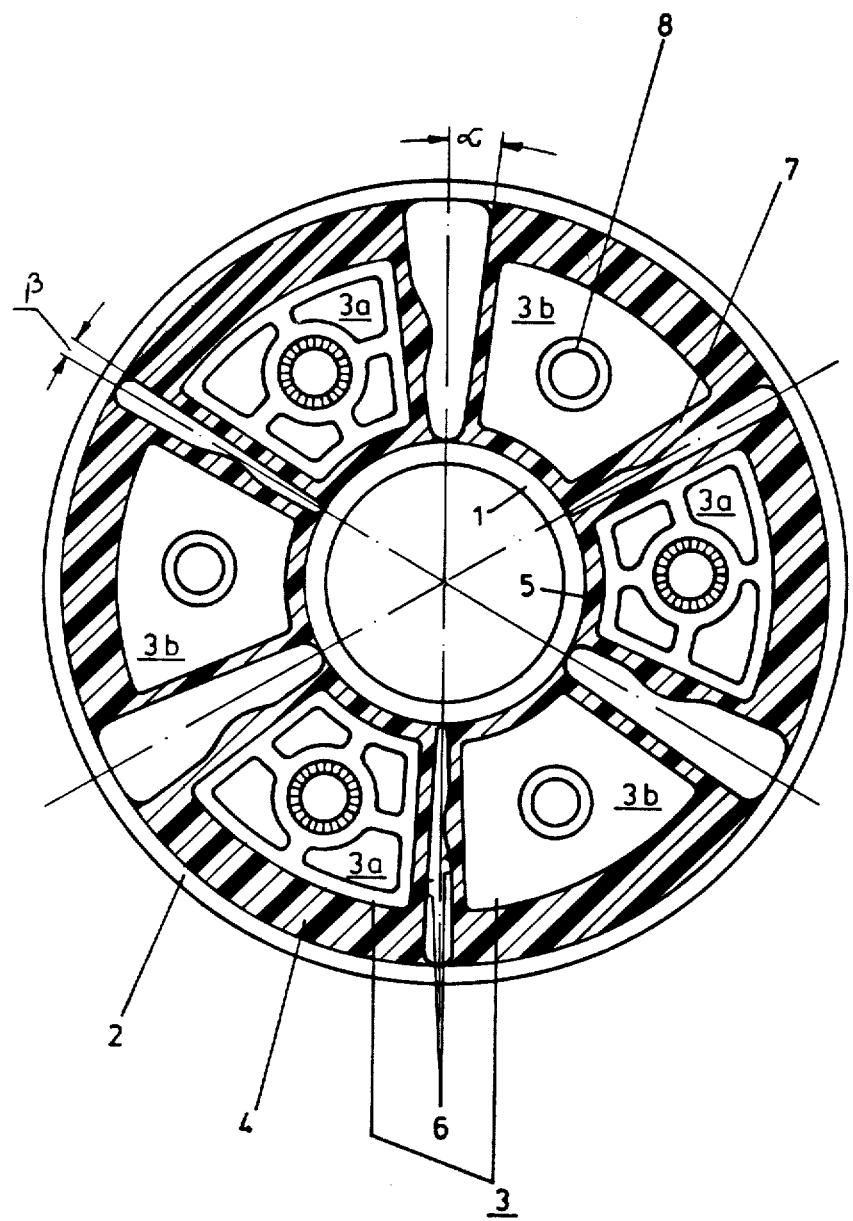
FIG. 4 shows a coupling with bulges on the buffer layers.

In FIG. 4, an embodiment is shown in a front view in which one of the buffer layers arranged opposite each other at a spacing is provided with a spherical bulge that extends circumferentially in the center of the end face. This mitigates the steep rise of the spring characteristic for form-locking force transmission. Instead of a single bulge, a multiplicity can also be provided and the bulges may also have a different shape, for instance, they may be in the form of ribs. In view of their purpose, however, the preferred shape of the bulge in all cases is similar to a bell curve.

What is claimed is:

1. In a rotary flexible coupling having first and second sets of driver blocks, the blocks of each set being spaced equally apart around the axis of rotation, the blocks of the first set being interleaved between the blocks of the second set, each of the blocks having radial end faces and having inner and outer circumferential surfaces, a first set of fastening elements to connect the first set of blocks to an input flange to receive torque therefrom, and a second set of fastening elements to connect the second set of blocks to an output flange to transmit torque thereto, the invention comprising:
   a first tire of inelastic material spaced radially inwardly from the inner circumferential surfaces of the blocks;
   a second tire of inelastic material spaced radially outwardly from the outer circumferential surfaces of the blocks;
   an inner layer of elastomeric material comprising cylindrical segments joining the inner circumferential surface of each of the blocks with the first tire; and
   an outer layer of elastomeric material comprising cylindrical segments joining the outer circumferential surface of each of the blocks with the second tire.

2. The invention according to claim 1 in which the thickness of the layers is approximately in the range of 0.7 to 2.5 times the mutual distance between the radial end faces of the driver blocks at the outside and inside circumference, respectively.

3. The invention according to claim 1 in which the layers are elastically pretensioned.

4. The invention according to claim 1 in which the circumferential surfaces of the driver blocks and the juxtaposed surfaces of the tires are spherical segments.

5. The invention according to claim 1 in which the angle which is enclosed by the respective radial end faces of the driver blocks has alternately a small and a large magnitude in a regularly recurring sequence.

6. The invention according to claim 5 in which the ratio of the large and the small angle is between approximately 1.5:1 to approximately 4:1.

7. The invention according to claim 1 in which the end faces of the driver blocks facing each other are provided at least on one side with a buffer layer of elastomeric material.

8. The invention according to claim 7 in which there is a buffer layer of elastomeric material on each radial surface of each of the blocks, and the surface of the buffer layers has at least one bulge extending in the circumferential direction.

* * * * *